United States Patent [19]
Hobbensiefken

[11] 3,929,202
[45] Dec. 30, 1975

[54] VEHICLE CAB CONFIGURATION EFFECTING REDUCTION OF AIR DRAG AND ENHANCING STORAGE SPACE CAPACITY AND CONVENIENCE

[76] Inventor: Dean W. Hobbensiefken, Rte. 1, Box 39, Lyons, Oreg. 97358

[22] Filed: Apr. 21, 1975

[21] Appl. No.: 569,754

[52] U.S. Cl............... 180/68 R; 296/1 S; 296/28 C
[51] Int. Cl.²..................... B60K 11/04; B62D 35/00
[58] Field of Search........ 180/68 R, 89 A, 64 R, 11; 296/1 S, 28 C, 28 G

[56] References Cited
UNITED STATES PATENTS

| | | | |
|---|---|---|---|
| 1,852,464 | 5/1932 | Leipert | 180/68 |
| 2,146,120 | 2/1939 | Ingildsen | 180/68 R |
| 2,253,209 | 8/1941 | Patton | 105/2 |
| 2,443,472 | 6/1948 | Mayo et al. | 62/117 |
| 2,514,695 | 7/1950 | Dempsey | 296/28 |
| 2,863,695 | 12/1958 | Stamm | 296/1 S |
| 3,163,995 | 1/1965 | Maier | 62/241 |
| 3,241,876 | 3/1966 | Saunders | 296/1 S |
| 3,309,131 | 3/1967 | Saunders | 296/1 S |
| 3,348,873 | 10/1967 | Saunders | 296/1 S |
| 3,415,566 | 12/1968 | Kerrigan | 296/1 S |
| 3,695,673 | 10/1972 | Meadows | 296/1 S |
| 3,697,120 | 10/1972 | Saunders | 296/1 S |
| 3,711,146 | 1/1973 | Madzsar | 296/1 S |
| 3,797,879 | 3/1974 | Edwards | 296/1 S |
| 3,814,472 | 6/1974 | Zelikovitz | 296/1 S |
| 3,827,523 | 8/1974 | Williams | 180/68 R |
| 3,834,752 | 9/1974 | Cook et al. | 296/1 S |
| D225,624 | 12/1972 | Hobbensiefken | D14/3 |

OTHER PUBLICATIONS
"Aerodynamically Styled Paymaster," Diesel Equipment Superintendent, Oct. 1973.

*Primary Examiner*—M. Henson Wood, Jr.
*Assistant Examiner*—David M. Mitchell
*Attorney, Agent, or Firm*—Watson, Cole, Grindle & Watson

[57] ABSTRACT

A motor vehicle of the type characterized by an engine assembly mounted between front and rear axles thereof has a particular cab configuration for reducing drag affecting movement of the vehicle through a fluid. Engine radiators may be provided extending laterally outwardly of the rear wall of the cab for reducing the entrance of air into the gap between the cab and a trailer on the vehicle. Further, this cab configuration provides for storage compartments which are significantly larger and more convenient than those to be found on conventional highway tractors.

11 Claims, 9 Drawing Figures

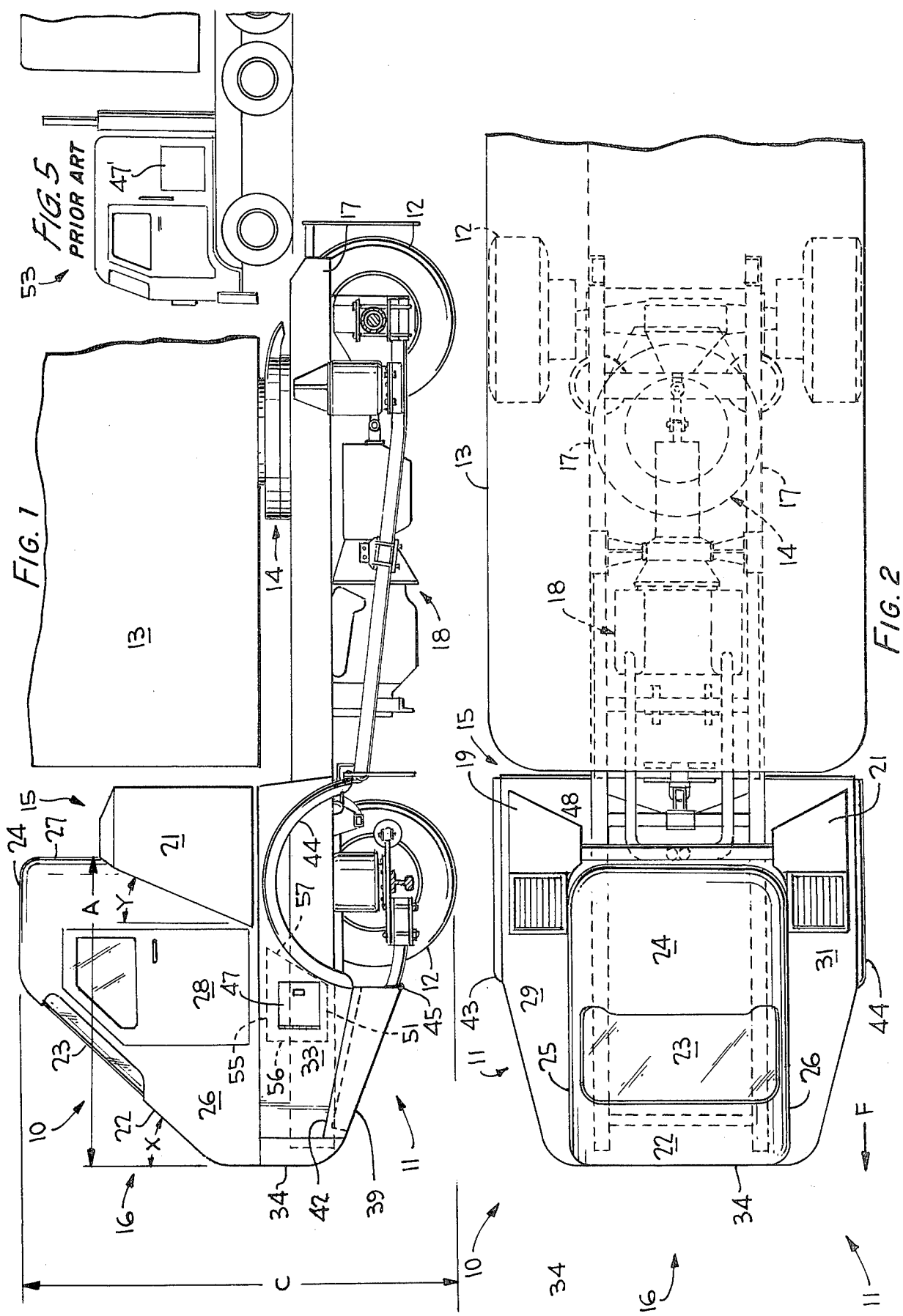

VEHICLE CAB CONFIGURATION EFFECTING REDUCTION OF AIR DRAG AND ENHANCING STORAGE SPACE CAPACITY AND CONVENIENCE

BACKGROUND OF THE INVENTION

1. Field of the Invention

This invention relates generally to a motor vehicle arrangement for effecting air drag reduction thereof, and more particularly to such an arrangement wherein the cab configuration is such as to effect a significant reduction of air drag during motor vehicle travel. This configuration also provides for enhanced storage compartment location and design.

2. Description of the Prior Art

The prior art is replete with all types of motor vehicle attachments designed to control the flow of air around especially tractor-trailer vehicles for the reduction of air drag of the vehicle during movement. Attachments of various types have been developed for the tractor and/or trailer to effect drag reduction as for example, air deflectors mounted on the front wall of the trailer, walls closing the gap between tractor and trailer, vortex stabilizer on the trailer front wall, air shields or air-flow divertors on the roof wall of the cab, scoops and funnels on the cab and trailer, etc.

Despite these approaches made in attempting to control the flow of air around the moving vehicle for reducing air drag, the results have not been impressive. The air drag reducers of the types described above have normally been provided at various locations of the conventional tractor and/or trailer, although wind tunnel tests have shown that such attachments are not effective in significantly reducing air drag and thereby horsepower to overcome air drag duing vehicle movement. Tests have revealed that installation of these attachments on the conventional or so-called "hi-tilt" tractor and trailer yielded some slight improvement in air drag reduction of amounts depending on the number and types of attachments used. Nevertheless, the means used for reducing wind resistance and air drag and for streamlining the vehicle are, for the most part, uneconomical, unsightly and impractical. Further, in current conventional and hi-tilt cab tractor cabs the depth of the storage compartments is limited by the width of the engine compartment and the location is of such height from the ground as to make insertion or removal of all but the lightest objects both difficult and inconvenient.

SUMMARY AND OBJECTS OF THE INVENTION

With the present invention a radical departure is made in the configuration of the cab over conventional and hi-tilt tractor cabs heretofore required, the present cab being aerodynamically designed to significantly reduce the horsepower needed to overcome air drag during vehicle movement and enhance both the capacity and convenience of storage compartments. The cab is readily adapted for use with a motor vehicle having its engine assembly mounted in accordance with my prior U.S. Pat. No. 3,732,942 and entitled "Removable Vehicle Chassis Sub-Frame with Engine." The trailer is, however, of the conventional elongated box type.

The cab is designed in accordance with the invention as having a forward wall which slopes rearwardly at an angle from the vertical, such forward wall being interconnected with a horizontal top wall and vertical side walls. Horizontal panels extend laterally outwardly of the side walls at the lower edges thereof, and vertical side panels extend downwardly therefrom. Under panels interconnect these vertical side panels and are sloped slightly upwardly toward the front bumper panel of the cab. Also, radiators may extend laterally outwardly of the cab side walls at the rear wall thereof, so that the overall aerodynamic design functions in significantly reducing the air drag of the moving vehicle.

It is therefore an object of the present invention to provide a tractor for a tractor-trailer combination vehicle wherein air drag is significantly reduced and fuel consumption is thereby reduced with enhanced storage space capacity and convenience.

Another object of the invention is to provide such a tractor of an aerodynamically designed configuration resulting in an improved airflow therearound without reducing the occupant capacity but enhancing the storage capacity and convenience of the cab, radiators operatively connected with the engine assembly extending laterally outwardly of the cab side walls for further reducing air drag by reducing the entrance of air into the gap between the tractor and the trailer.

A further object is to provide such a cab as having a front wall sloping rearwardly from a vertical axis, and having horizontal panels extending laterally outwardly of the cab vertical side walls with vertical side panels extending downwardly therefrom and interconnected by under panels sloping forwardly and upwardly toward the front bumper of the cab.

A still further object is to provide such a cab having a storage compartment of conventional style and capacity located below the door or doors so as to be more convenient for the insertion and removal of heavy articles, with the further provision of a unique large capacity storage compartment of approximately double the normal length and depth located under the front bumper and opened and closed by air cylinders which are controlled from the interior of the cab so as to be more convenient and less prone to vandalism.

Other objects, advantages and novel features of the invention will become more apparent from the detailed description when taken in conjunction with the accompanying drawings.

BRIEF DESCRIPTION OF THE DRAWINGS

FIG. 1 is a side elevational view of a cab designed in accordance with the present invention for a tractor trailer combination vehicle;

FIG. 2 is a top plan view of the vehicle of FIG. 1;

FIG. 5 is a schematic side elevation showing part of a conventional "hi-tilt cab" tractor-trailer combination vehicle;

DESCRIPTION OF THE PREFERRED EMBODIMENT

Figure 3:
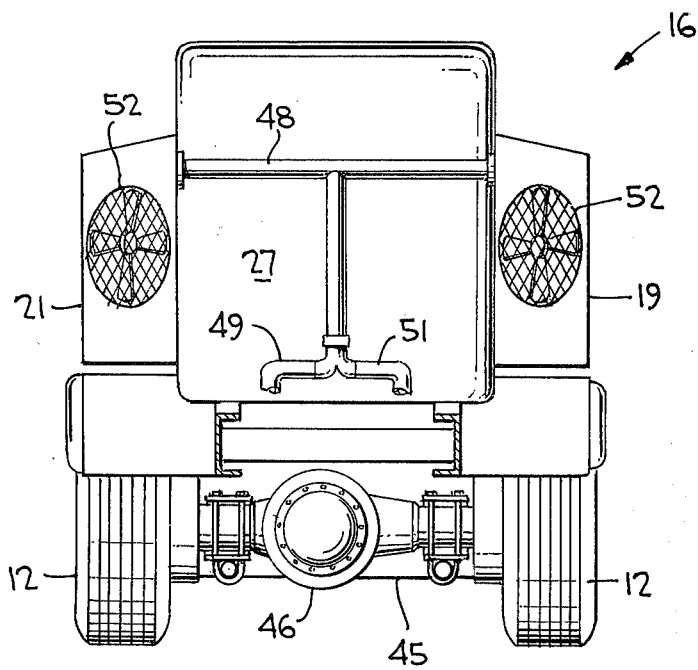
FIGS. 3 and 4 are respectively rear and front elevational views of the cab configureation of FIG. 1.

Turning now to the drawings wherein like reference characters refer to like and corresponding parts throughout the several views, a tractor-trailer combination vehicle 10 according to the invention is shown in FIGS. 1 and 2 wherein tractor 11 is mounted on wheels 12, and a conventional trailer 13 is articulated on the fifth wheel 14 and presents an air gap 15 with the tractor. Cab 16 of the tractor, to which the invention is directed, is secured in place on a main frame 17 of the tractor. The tractor construction without the cab is similar to that shown in my prior U.S. Pat. No. 3,732,942, the entirety of the disclosure therin being specifically incorporated in the present application by reference. As shown in that patent, an engine assembly 18 is disposed between the front and rear axles of the tractor although, unlike that of my prior patent, radiator assemblies and/or air conditioner condensor assemblies 19 and 21 are mounted in place directly on cab 16 for the purpose and in a manner to be hereinafter described. These radiators are operatively interconnected with the engine assembly in a manner to be hereinafter described.

Cab 16, with an overall width dimension B approximately equal to that of a standard trailer, an overall bumper-to-back of cab length (dimension A) of approximately 88%, of dimension B and an overall height from the ground (dimension C) of approximately 122% of dimension B, is constructed as having a front wall 22 sloping rearwardly from the vertical at an angle $x$ (see FIG. 1) equal to approximately 47°. It should be noted that these basic relationships, and others hereinafter referred to, are of vital importance to the aerodynamic efficiency of cab 16. This wall has a standard windshield 23 mounted therein, and the front wall intersects with a horizontal roof wall 24 with a corner radius of approximately 5 to 8% of dimension B. Opposite side walls 25 and 26 of the cab are respectively interconnected with opposite edges of the front and roof walls, with corner radii of approximately 5 to 8% of dimension B at the junctions of 25 and 26 with 22 and 24, and a rear wall 27 of the cab interconnects the rear edges of the cab side walls as well as that of the cab roof wall at which junction the corner radius is approximately 5 to 8% of dimension B. The side walls have conventional cab doors 28 therein mounted in any normal manner.

Figure 4:
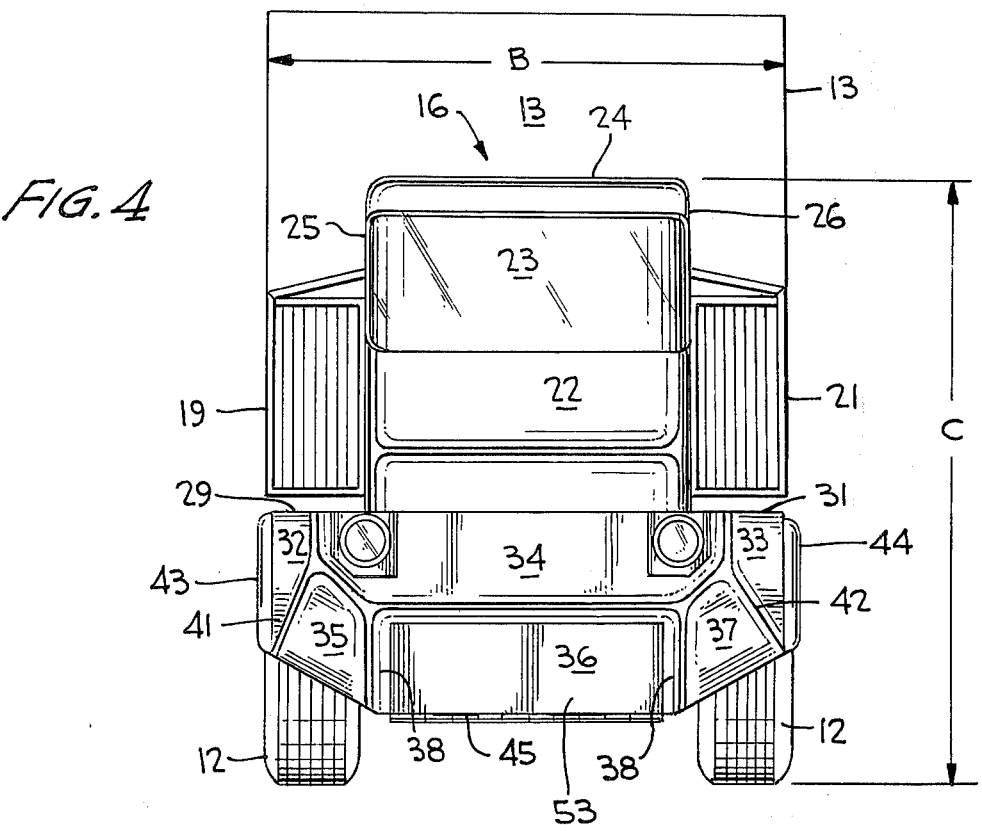

Cab 16 has horizontal panels 29 and 31 extending laterally outwardly of the lower edges of respective side walls 25 and 26, vertical side panels 32 and 33 extending downwardly from the respective horizontal panels 29 and 31 (see FIG. 4 in particular). As seen in FIGS. 2 and 4, these vertical side panels converge slightly toward one another in a forward direction F, and terminate at a vertical bumper panel 34 extending transversely across the front of the cab between panels 32 and 33. Flat under panels 35, 36 and 37 are interconnected along joints 38 and 39, panels 35 and 37 being respectively connected to panels 32 and 33 along joints 41 and 42. As can be seen, each of these under panels 35, 36 and 37 slope upwardly in a forward direction toward bumper panel 34. Also, as can be seen particularly in FIGS. 4 and 7, a front storage compartment panel 53, capable of being opened and closed in a manner to be hereinafter described, occupies the major portion of panel 36. And, side panels 32 and 33 have wheel cutouts forming fenders 43 and 44 thereon. Also, it should be pointed out that the lower edge 45 of under panel 36 is of substantially the same elevation from the ground as engine assembly 18 and the differential assembly 46 (see especially FIG. 3) thereby serving to effectively direct the flow of air downwardly away from these components extending beneath the tractor; during forward movement of the vehicle.

Radiator and/or condensor assemblies 19 and 21 are mounted on the cab by any suitable means in such a manner as to extend laterally outwardly of side walls 25 and 26 and rearwardly of rear wall 27 of the cab. Further, the radiator assemblies are mounted sloping rearwardly from the vertical at an angle Y, which is as nearly equal to angle X as is practically achievable. The radiator and/or condensor assemblies are operatively connected to engine assembly 18 by means of a suitable T-connection 48 and piping 49, 51. Each of these radiators and/or condensors has a fan or fans 52 mounted therein. The fans are unobstructed forwardly and rearwardly thereof since the radiators extend wholly outwardly of the cab side walls. Therefore the fans, which take advantage of the direct ram air effect thereon, consequently consume less horsepower than fans of comparable capacity.

Wind tunnel tests using scale models of tractor-trailer combination vehicles such as 10 shown in FIG. 1 versus a conventional hit-tilt cab tractor-trailor combination vehicle such as 53 shown in FIG. 5 produced data showing a significant reduction in air drag over the conventional hi-tilt cab model. For example, the horsepower needed to overcome air drag simulated for a level highway at 55 mph driving speed and at 0° yaw (i.e., head-on into the wind) was found to be approximately 14 percent less with the tractor-trailer in accordance with the invention as compared to the conventional hi-tilt cab tractor-trailer 53 of FIG. 5. At 5° and 10° yaw, which is a crosswind equivalent of 5 mph and 10 mph with the vehicles traveling at a speed of 55 mph on a level highway, the horsepower needed to overcome air drag was found to be respectively about 16 percent and 18 percent less for vehicle 10 as compared to vehicle 53. The test data further revealed that at a 15° yaw angle, which is the crosswind equivalent of 15 mph, approximately 30 percent less horsepower is needed to overcome air drag for vehicle 10 as compared to vehicle 53 while traveling at a speed of 55 mph on a level highway.

Figure 6A:
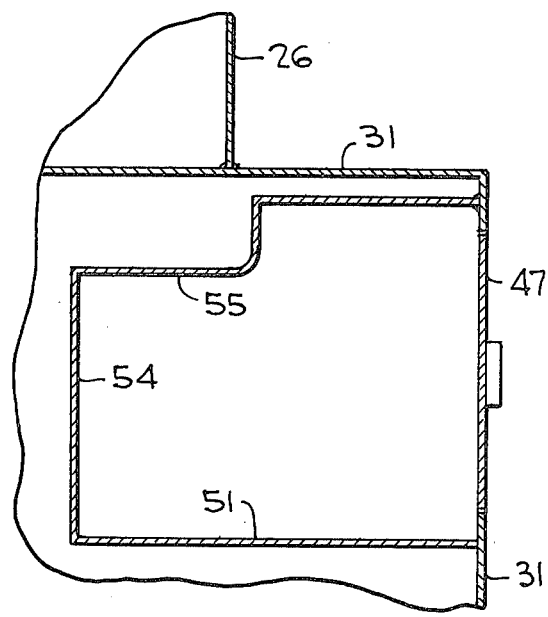
FIGS. 6A and 6B are respectively side and front elevational views showing, in greater detail and in general outline, the relative location and approximate relative size and shape of a side storage compartment.
Figure 6B:
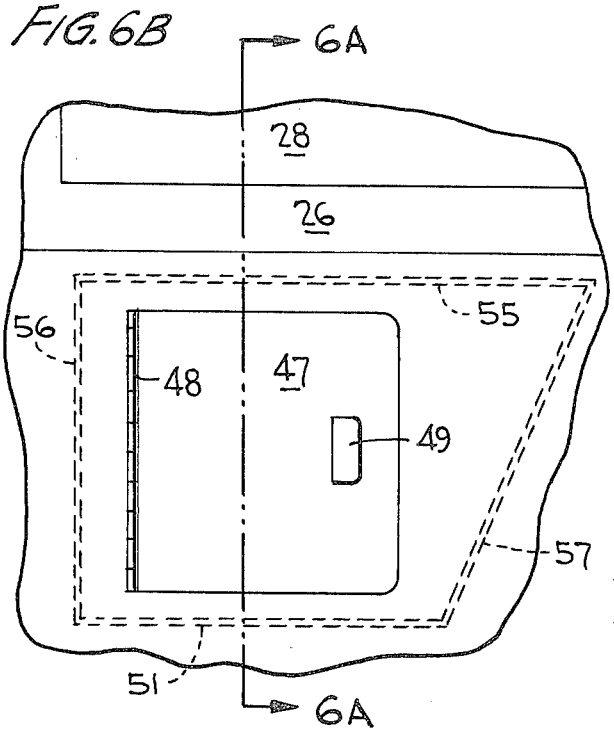

As compared to side storage compartment 47′ normally provided for the hi-tilt cab 53 shown in FIG. 5, the side storage compartment or compartments of the present invention, which may be symmetrically opposite when two are used, are located immediately below horizontal panels 29 and 31. The forward edge of a door 47 provided for such compartment is located slightly rearwardly of the forward edge of cab door 28. Door 47 is hinged along this forward edge by means of a typical piano type hinge 48, and has a normal flush type locking handle 49. As can be seen, particularly in FIGS. 6A and 6B, the side storage compartment is formed by a bottom panel 51, an inner panel 54, an upper panel 55, and a forward and rearward panel 56 and 57, respectively. All panels are joined in a rigid and waterproof manner and are attached to cab 16 in an appropriate manner.

Figure 7A:
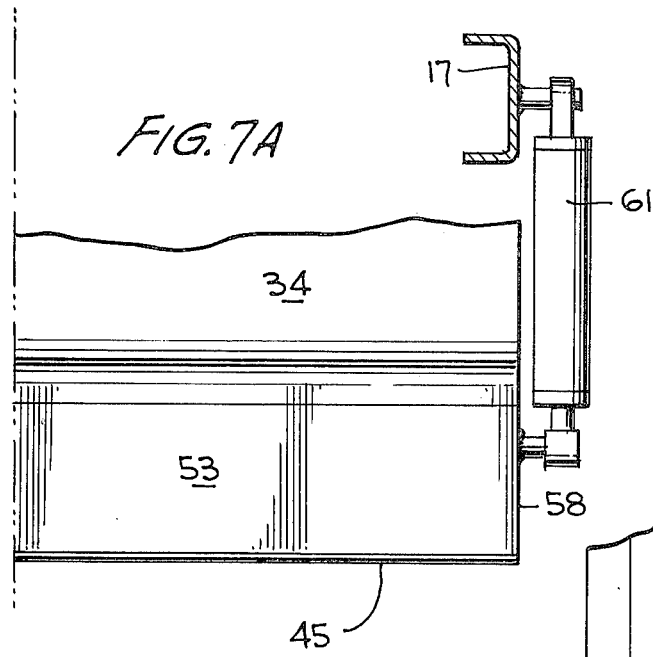
FIGS. 7A and 7B are respectively side and front elevational views showing, in greater detail and in general outline, the relative location, approximate relative size and shape, and basic opening and closing means of the front storage compartment.
Figure 7B:
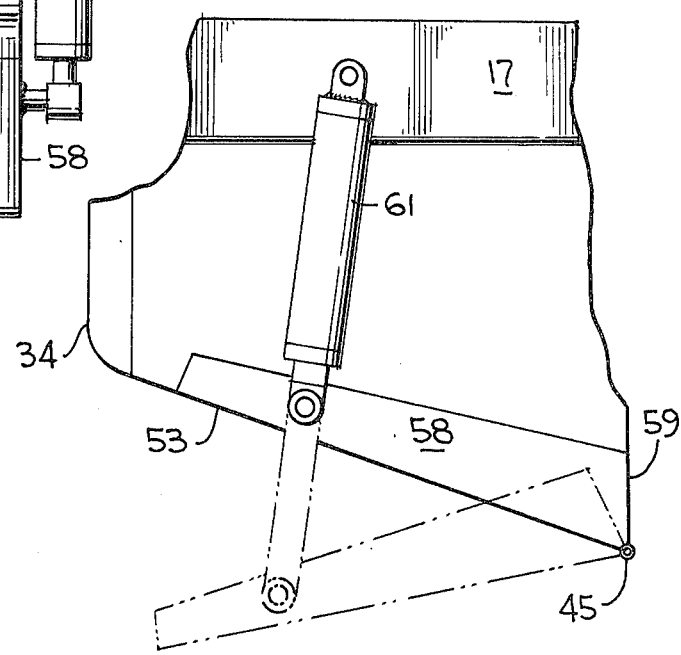

The forward storage compartment, as can be seen particularly in FIGS. 7A and 7B, is symmetrical about the cab centerline, is located directly behind bumper panel 34 and is approximately the same width as the distance between chassis frame members 17. The compartment is constructed of a lower panel 53, side panels 58 and a rear panel 59. The compartment is opened and closed by air cylinders 61 or the like attached to the two main frame members 17 and the side panel 58.

The cylinders are controlled by a standard valve (not shown) located in the interior of the cab 16.

From the foregoing it can be seen that a unique and efficient, yet highly effective tractor cab configuration has been devised with requires significantly less horsepower to overcome air drag, and consequently less fuel to overcome aerodynamic drag, as compared to the conventional hi-tilt cab tractor-trailer combination vehicles. Further, it can be seen that the capacity and convenience of the storage compartments, especially due to their location as compared to those on a conventional hi-tilt cab, are significantly enhanced.

Obviously, many modifications and variations of the present invention are made possible in the light of the above teachings. It is therefore to be understood that within the scope of the appended claims the invention may be practiced otherwise than as specifically described.

What is claimed is:

1. In a tractor-trailer combination vehicle having a gap between the tractor and the trailer, and an engine assembly mounted on said tractor between the front and rear axles thereof, a cab mounted on said tractor and having a flat horizontal roof at an elevation below the elevation of the trailer roof, and said cab having flat vertical side walls spaced apart a distance less than the distance between the side walls of the trailer, said cab further having a flat front wall interconnecting said cab roof and said cab side walls, said front wall sloping in a rearward direction of vehicle travel, said cab having panels extending transversely outwardly of the lower edges of said side walls, vertical side panels extending downwardly of said transversely extending panels, under panels interconnecting said side panels, and a vertical bumper panel interconnecting said side panels and said under panels, radiators on said cab being operatively connected to said engine assembly and extending laterally outwardly of said cab side walls, said radiators further extending rearwardly of said cab toward said trailer, whereby said radiators function in cooling the engine of the engine assembly as they are directly exposed to the oncoming air moving alongside said cab walls during movement of the vehicle in its forward direction of travel, and said radiators serve to partially close the gap between said cab and said trailer, thereby also functioning as an air shield at said gap, and whereby the configuration of said cab results in reduced horsepower needed to overcome aerodynamic drag during vehicle travel in the forward direction.

2. In the tractor-trailer combination of claim 1, wherein said front wall of said cab slopes rearwardly at an angle of about 47° to a vertical plane bisecting said front wall.

3. In a tractor-trailer combination of claim 2, wherein said radiators have front surfaces approximately parallel to said sloping front wall of said cab.

4. In the tractor-trailer combination of claim 3, wherein said transversely extending panels are horizontal, said vertical side panels sloping forwardly and inwardly toward said bumper panel with the maximum distance between said vertical side panels being about equal to the distance between said trailer side walls, and said under panels sloping upwardly toward said bumper panel.

5. In the tractor-trailer combination of claim 1, said cab further including at least one storage compartment mounted between said vertical side panels, said compartment having a door panel located in one of said vertical side panels for providing access to said storage compartment.

6. In the tractor-trailer combination of claim 1, said cab further including a front storage compartment mounted behind one of said under panels, said front storage compartment including a door panel occupying a major portion of said one under panel, and means for opening and closing said door panel.

7. In a tractor-trailer combination vehicle having a gap between the tractor and the trailer, and an engine assembly mounted on said tractor between the front and rear axles thereof, a cab mounted on said tractor and being of less height than said trailer, said cab having a vertical rear wall, a front wall, a roof and side walls, said front wall sloping rearwardly toward said roof wall at an angle of about 47° to a vertical plane bisecting said front wall, said tractor further having horizontal panels extending transversely outwardly of said side walls at the lower edges thereof, vertical side panels extending downwardly from said horizontal panels, under panels interconnecting said vertical side panels, and a vertical bumper panel interconnecting said side panels and said under panels, the maximum distance between said vertical side panels being about equal to the distance between the side walls of said trailer, whereby said cab presents a streamlined structure for the reduction of air drag of the vehicle during movement thereof in a forward direction of its travel.

8. In the tractor-trailer combination of claim 7, further including engine radiators mounted on said cab and being operatively connected with said engine assembly, said radiators extending wholly outwardly of said cab side walls and rearwardly of said cab rear wall so as to partially bridge the gap between said cab and said trailer.

9. In the tractor-trailer combination of claim 8, wherein said radiators lie adjacent said lower edges of said cab side walls and have front surfaces approximately parallel to said sloping front wall of said cab.

10. In the tractor-trailer combination of claim 7, said cab further including at least one storage compartment mounted between said vertical side panels, said compartment having a door panel located in one of said vertical side panels for providing access to said storage compartment.

11. In the tractor-trailer combination of claim 7, said cab further including a front storage compartment mounted behind one of said under panels, said front storage compartment including a door panel occupying a major portion of said one under panel, and means for opening and closing said door panel.

* * * * *